(12) United States Patent
Noble

(10) Patent No.: US 6,913,010 B2
(45) Date of Patent: Jul. 5, 2005

(54) REUSABLE FIRE STARTER AND METHOD OF USE

(75) Inventor: John Christopher Noble, San Diego, CA (US)

(73) Assignee: Firebuddy LP, Las Vegas, NV (US)

( * ) Notice: Subject to any disclaimer, the term of this patent is extended or adjusted under 35 U.S.C. 154(b) by 0 days.

(21) Appl. No.: 10/683,321

(22) Filed: Oct. 10, 2003

(65) Prior Publication Data

US 2005/0076898 A1 Apr. 14, 2005

(51) Int. Cl.[7] ............................................... F23N 5/20
(52) U.S. Cl. .................................................... 126/6
(58) Field of Search .......................... 431/6, 7, 325, 431/326; 126/25 B, 43, 59.5; 44/540

(56) References Cited

U.S. PATENT DOCUMENTS

| | | | | |
|---|---|---|---|---|
| 381,237 A | * | 4/1888 | Hanmore ..................... 502/410 |
| 418,316 A | * | 12/1889 | Gathemann .................. 431/327 |
| 2,531,828 A | * | 11/1950 | Schultz ......................... 44/521 |
| 2,854,321 A | * | 9/1958 | Stanton ........................ 44/540 |
| 3,413,967 A | * | 12/1968 | Hoock ......................... 431/288 |
| RE26,579 E | * | 5/1969 | Waddell ..................... 126/59.5 |
| 3,540,865 A | * | 11/1970 | Pape ........................... 431/326 |
| 3,613,658 A | * | 10/1971 | Knowles et al. .............. 44/275 |
| 4,840,672 A | * | 6/1989 | Baes ........................... 106/716 |
| 6,692,678 B2 | * | 2/2004 | Krowl et al. ................. 264/333 |

* cited by examiner

*Primary Examiner*—Alfred Basichas
(74) *Attorney, Agent, or Firm*—Stephen C. Beuerle; Procopio Cory Hargreaves & Savitch LLP

(57) ABSTRACT

A method of using a fire starter includes providing a fire starter made of a calcium silicate hydrate with an inflammable liquid and a packaging at least partially surrounding the fire starter; removing a portion of the packaging to expose a portion of the surface area of the fire starter less than the entire surface area of the fire starter; and lighting the fire starter so that the inflammable liquid in the fire starter burns without significantly affecting the integrity of the fire starter and a flame burns from the exposed portion of the surface area of the fire starter.

14 Claims, 4 Drawing Sheets

REUSABLE FIRE STARTER AND METHOD OF USE

FIELD OF THE INVENTION

The present invention is in the field of fire starting devices and methods.

BACKGROUND OF THE INVENTION

Numerous devices and chemicals exist to assist one in starting a fire (e.g., fireplace fire, charcoal fire, campfire). Historically, kindling and/or newspaper was used to start a fire. A company called Duraflame® sells a fire starter called firestart® that is used to assist one in starting a composite fire log or wood fire. Lighter fluid or fuel is doused on charcoal briquettes and then lit to facilitate ignition of the charcoal briquettes of a charcoal fire. A problem with all of the devices and chemicals used in starting a fire is that none of them are re-usable. Consequently, these firestarting devices or chemicals are consumed with the fire and no longer effective after a single use.

SUMMARY OF THE INVENTION

Accordingly, an aspect of the invention involves a reusable fire starter and method that may be used multiple times to start a fire. After each use, the fire starter is simply placed in a container for storage until the next time it is needed to start a fire.

An additional aspect of the invention involves method of using a fire starter to light one or more ignitable elements of a fire. The method includes providing a fire starter made of a low-density xonotlite calcium silicate hydrate; adding an inflammable liquid to the fire starter; positioning the fire starter under one or more ignitable elements; lighting the fire starter so that the inflammable liquid in the fire starter burns without significant combustion of the fire starter; lighting the one or more ignitable elements with the fire starter; removing the fire starter after the fire is consumed; and reusing the fire starter to light one or more new, different ignitable elements for a new fire.

Another aspect of the invention involves a method of using a fire starter to light one or more ignitable elements of a fire including providing a fire starter made of a calcium silicate hydrate adsorbed with an inflammable liquid; positioning the fire starter adjacent one or more ignitable elements; lighting the fire starter so that the inflammable liquid adsorbed in the fire starter burns without significantly affecting the integrity of the fire starter; lighting the one or more ignitable elements with the fire starter to start the fire; and repeating the above steps with the same fire starter to light one or more new, different ignitable elements for a new fire.

A further aspect of the invention involves a method of using a fire starter to light one or more ignitable elements of a fire including the steps of providing a fire starter made of a material that maintains its integrity and does not break down at elevated temperatures of a fire, has low thermal conductivity at elevated temperatures of a fire, is non-combustible, is highly absorbent, is environmentally friendly, drying restores its original properties, thermal efficiencies do not deteriorate over time, has low thermal shrinkage, and has no binders that can break down at elevated temperatures of a fire; causing the fire starter to be adsorbed with an inflammable liquid; positioning the fire starter adjacent one or more ignitable elements; lighting the fire starter so that the inflammable liquid adsorbed in the fire starter burns without significantly affecting the integrity of the fire starter; lighting the one or more ignitable elements with the fire starter to start the fire; and repeating the above steps with the same fire starter to light one or more new, different ignitable elements for a new fire.

A further aspect of the invention involves a method of using a fire starter. The method includes providing a fire starter made of a low-density xonotlite calcium silicate hydrate with an inflammable liquid and a packaging at least partially surrounding the fire starter; removing a portion of the packaging to expose a portion of the surface area of the fire starter less than the entire surface area of the fire starter; and lighting the fire starter so that the inflammable liquid in the fire starter burns without significant combustion of the fire starter and a flame burns from the exposed portion of the surface area of the fire starter.

A still further aspect of the invention involves a method of using a fire starter. The method includes providing a fire starter made of a calcium silicate hydrate with an inflammable liquid and a packaging at least partially surrounding the fire starter; removing a portion of the packaging to expose a portion of the surface area of the fire starter less than the entire surface area of the fire starter; and lighting the fire starter so that the inflammable liquid in the fire starter burns without significantly affecting the integrity of the fire starter and a flame burns from the exposed portion of the surface area of the fire starter.

A yet further aspect of the invention involves a method of using a fire starter. The method includes providing a fire starter with an inflammable liquid and a packaging at least partially surrounding the fire starter, the fire starter made of a material that maintains its integrity and does not break down at elevated temperatures of a fire, has low thermal conductivity at elevated temperatures of a fire, is non-combustible at elevated temperatures of a fire, and is highly absorbent; removing a portion of the packaging to expose a portion of the surface area of the fire starter less than the entire surface area of the fire starter; and lighting the fire starter so that the inflammable liquid in the fire starter burns without significantly affecting the integrity of the fire starter and a flame burns from the exposed portion of the surface area of the fire starter.

Further objects and advantages will be apparent to those skilled in the art after a review of the drawings and the detailed description of the preferred embodiments set forth below.

DETAILED DESCRIPTION OF PREFERRED EMBODIMENTS

Figure 1:
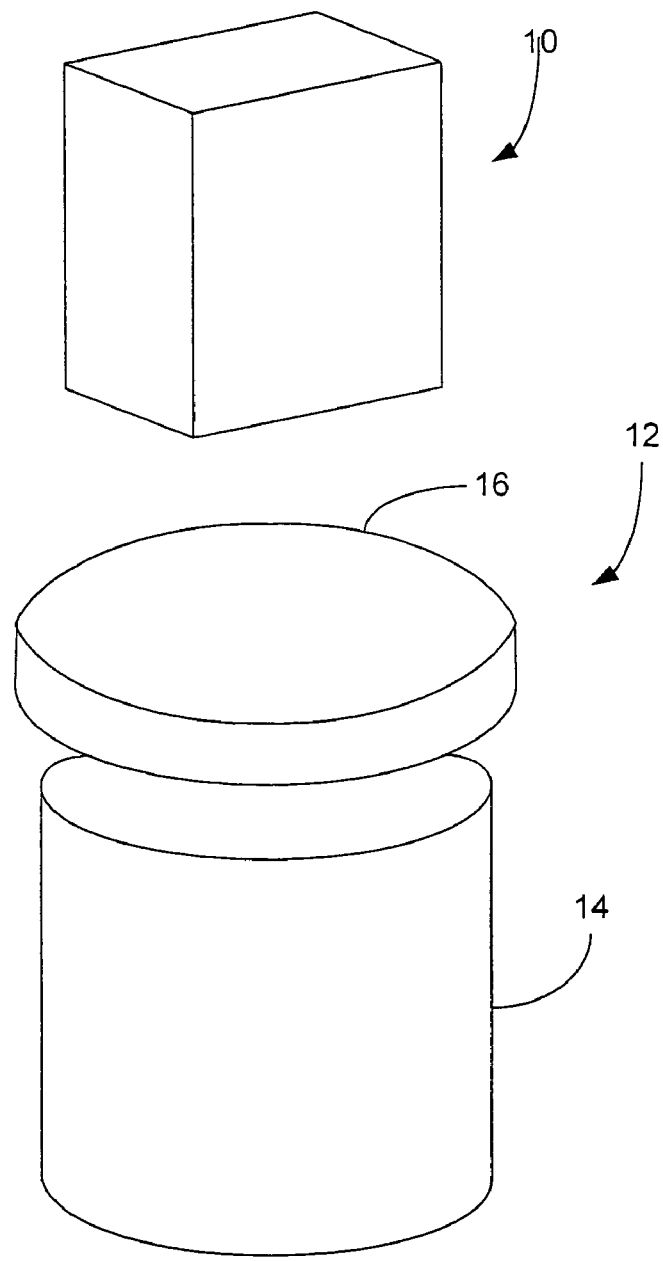
FIG. 1 is a perspective view of an embodiment of a fire starter and a container that may be used to store the fire starter.
Figure 2:
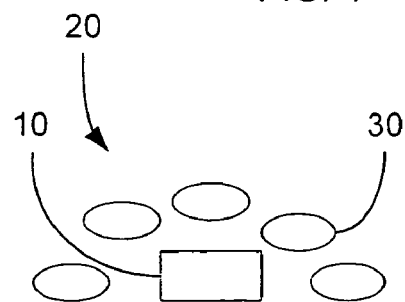
FIG. 2 is a simple side elevational view of the fire starter being used with a plurality of ignitable elements (e.g., charcoal briquettes, wood) to assist in starting a fire.

With reference to FIGS. 1–4, a fire starter 10 constructed in accordance with an embodiment of the invention and an exemplary method of using the same will now be described.

In the embodiment shown, the fire starter 10 has a generally rectangular block configuration. The fire starter 10 is preferable made of calcium silicate, and preferably low-density xonotlite calcium silicate hydrate. In alternative embodiments, other types of calcium silicates may be used for the fire starter 10, or other types of materials having the properties and features similar to those described below may be used for the fire starter 10.

The preferred type of low-density xonotlite calcium silicate hydrate used for the fire starter 10 is sold under the tradename INSULITE 1050 by Insulite (Pty) Ltd of South Africa. The low-density xonotlite calcium silicate hydrate is formed of intermeshed, evenly distributed needle-like crystals. The formation of the crystals is achieved under controlled conditions by hydrothermal synthesis (autoclaving). The raw materials for the calcium silicate are blended, then the mixture is poured into large molds, and then autoclaved in computer-controlled autoclaves. The density of the low-density xonotlite calcium silicate hydrate may range from 240 to 400 kg/m3, and is preferably about 265 kg/m3. After de-molding, blocks of the low-density xonotlite calcium silicate hydrate material are dried before being precision cut into the generally rectangular blocks of the fire starter 10.

The chemical analysis for the preferred low-density xonotlite calcium silicate hydrate material used for the fire starter 10 is as follows:

$SiO_2$ 44% CaO 42%
$TiO_2$ 0.1% $Na_2O$ 0.1%
$Al_2O_3$ 0.5% $K_2O$ 0.1%
$Fe_2O_3$ 0.2% LOI (1050° C.) 10.5%
MgO 1.5%

The technical properties for the preferred low-density xonotlite calcium silicate hydrate material used for the fire starter 10 are as follows:

Max Service Temperature 1050 (° C.)
Specific Heat 0.84 kJ (kg·K)
Bulk Density 265 dry kg/m3
Coefficient of reversible thermal expansion 4.0·10-6 (K-1) 20° C.–750° C.
Linear Heat Shrinkage (max 1.8%) 1.1 12 hrs @ 1000° C.
Pyrometric cone equivalent 1400° C.
Compressive Strength 1.8 MPa
Modulus of Rupture 0.8 MPa
Total Porosity 90%
Thermal Conductivity (ASTM C-201 Supplemented by ASTM C-182)
0.07 W/(m·k) at 200° C.
0.09 W/(m·k) at 400° C.
0.11 W/(m·k) at 600° C.

Some of the features and benefits of the preferred low-density xonotlite calcium silicate hydrate material used for the fire starter 10 include low thermal conductivity at elevated temperatures, maintains integrity up to 1050 deg C., non-combustible (will not contribute smoke or flame during fire), excellent creep resistance (dimensionally stable in all conditions), environmentally friendly (safe and non-irritating to skin or mucous membranes, contains no asbestos), insoluble in water (not damaged when soaked and will not rot, drying restores original properties), can be water-proofed (prevents loss of thermal efficiencies due to water absorption), thermal efficiencies do not deteriorate over time (original design parameters are maintained), free of organic binding resins (no smoke emission or gradual breakdown of thermal efficiencies), low heat storage (conserves energy when heating up equipment), low thermal shrinkage (dimensionally stable at high temperatures), gas resistant (CO1, NH3, H2, N2 and CH4), unaffected by UV light (will not deteriorate in direct sunlight), low thermal conductivity, excellent heat resistance (withstands continuous heat up to 1050° C.), retains full integrity over time and at high temperatures, contains no binders that can break down at high temperatures or over time ensuring optimal thermal performance throughout the lifespan of fire starter 10, inert, non-degradable, non-combustible, non-toxic when exposed to fire, does not cause skin irritation, sulphur free and low iron content, and extremely low chloride content.

Figure 3:
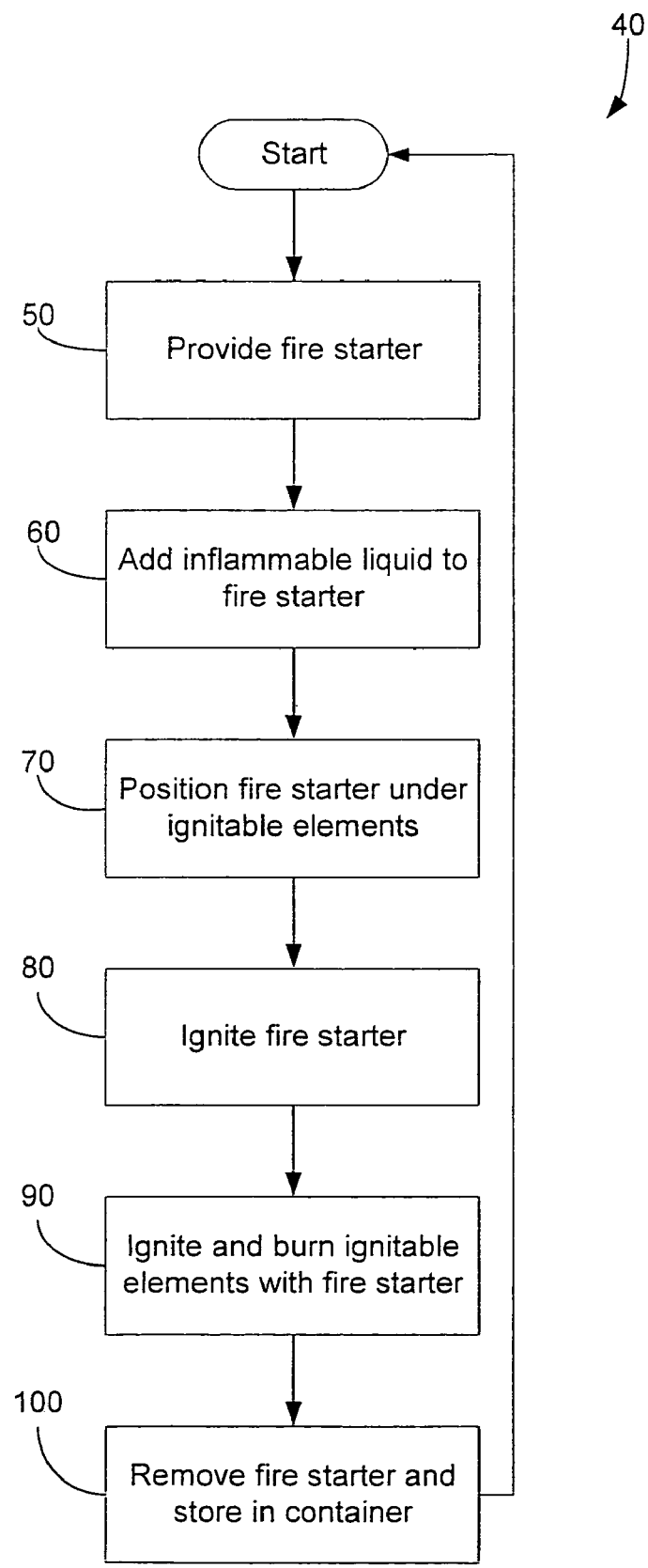
FIG. 3 is a flow chart of an exemplary method of using the fire starter of FIG. 1.

With reference to FIGS. 1–4, and particularly to FIG. 3, an exemplary method 40 of using the fire starter 10 for lighting a fire 20 (e.g., charcoal fire, fireplace fire, campfire) will now be described. At step 50, the fire starter 10 is provided. This may include removing the fire starter 10 from a container 12 by first grabbing a container body 14 and removing a cap 16 from the container body 14. The fire starter 10 may be removed from the container body 14 using one's hands or by turning the container body 14 upside-down, so the fire starter 10 is emptied out onto a surface. At step 60, an inflammable liquid (e.g., lighting fluid, camp fuel, citronella, kerosene) commonly used to start a fire is added to the fire starter 10. The fire starter 10 absorbs the inflammable liquid during this step. As will be described in more detail below with respect to FIG. 4, this step may include adding the inflammable liquid to the container 12, inserting the fire starter 10 into the container 12 and the inflammable liquid so that the fire starter 10 absorbs the inflammable liquid. At step 70, which may be prior to step 60 or after step 60, the fire starter 10 is positioned under ignitable elements 30 (e.g., charcoal briquettes, firewood, kindling). During this step, the fire starter 10 may first be positioned on a surface and the ignitable elements 30 may be added around or over the fire starter 10 while keeping the fire starter 10 exposed, or the fire starter 10 may inserted in between or underneath the ignitable elements 30. At step 80, the exposed part of the fire starter 10 is ignited with a match or lighter. This causes the absorbed lighter fluid in the fire starter 10 to burn until the lighter fluid is consumed, which is typically 5–15 minutes. At step 90, the flames from the fire starter 10 ignite and burn the ignitable elements 30 of the fire 20. After the fire 20 is completed and the ignitable elements 30 consumed and cooled, the fire starter 10 is removed from the ashes and placed in the container 12. The fire starter 10 is stored for re-use in the container 12 and when it is desired to light another fire, the method 40 of using the fire starter 10 starts over at step 50.

Figure 4:
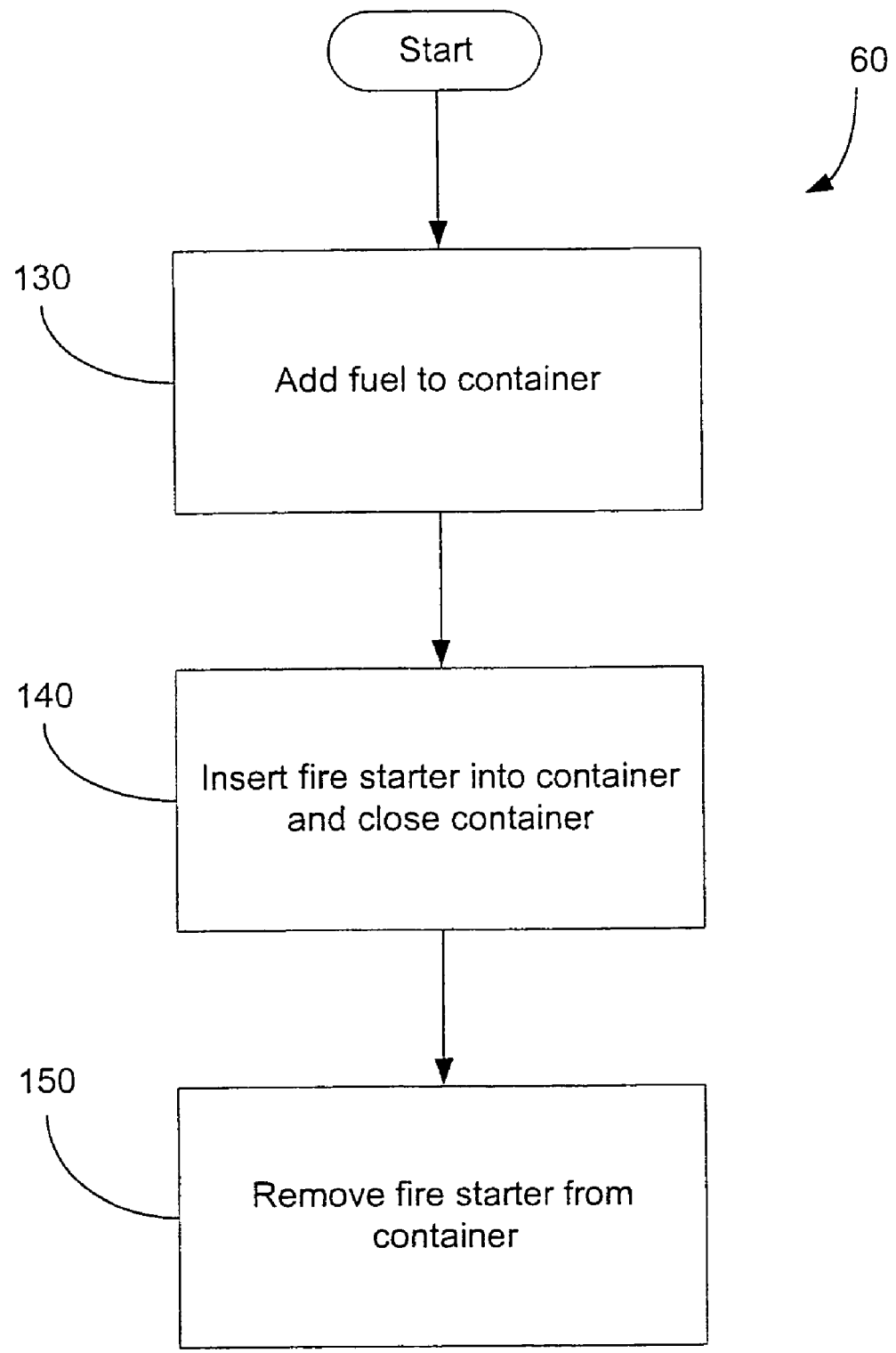
FIG. 4 is a flow chart of an exemplary method of adding inflammable liquid to the fire starter or replenishing the fire starter with inflammable liquid.

With reference to FIG. 4, an exemplary method 60 of adding inflammable liquid to the fire starter 10 or replenishing the fire starter 10 with inflammable liquid will be described. First, at step 130, the inflammable liquid (e.g., lighting fluid, camp fuel, citronella, kerosene) is added to the container body 14. Preferably, the container body 14 is filled about ⅛ of its volume with the inflammable liquid. Next, at step 140, the fire starter 10 is inserted into the container body 14 and the inflammable liquid. The container body 14 may be capped with cap 16 during this step. During step 140, the inflammable liquid is absorbed by the fire starter 10. Finally, at step 150, the fire starter 10 is removed from the container 12 after the inflammable liquid is absorbed by the fire starter 10. The fire starter 10 is now ready for use to start a fire.

Figure 5:
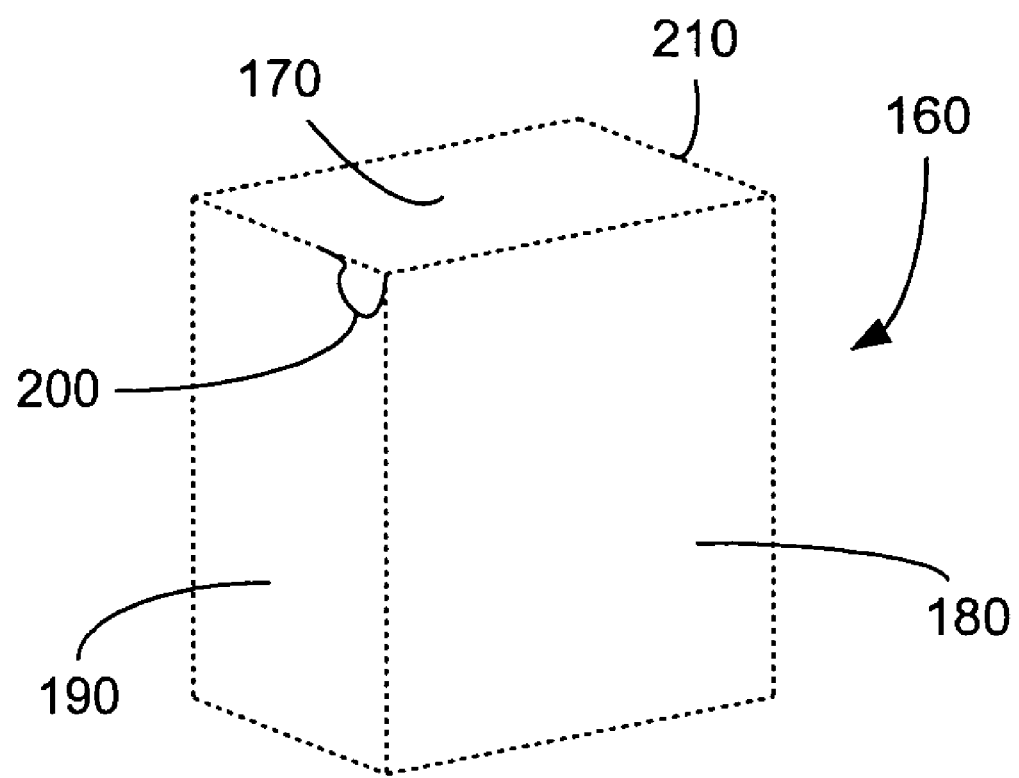
FIG. 5 is a perspective view of an embodiment of packaging for the firestarter illustrated in FIG. 1.

With reference to FIG. 5, the fire starter 10 may be pre-loaded with inflammable liquid (e.g., lighting fluid, camp fuel, citronella, kerosene) and pre-packaged in packaging 160. The inflammable liquid may be injected or otherwise added to the fire starter 10 prior to packaging. Then, the fire starter 10 may vacuum-packed or otherwise sealed with packaging 160. Preferably, the packaging 160 substantially conforms in shape and is substantially snug with and around the fire starter 10. The packaging 160 may be made of an aluminum material, tin foil material, or other flexible material. The material for the fire starter 10 may be chemically inert with respect to the first starter material and the inflammable liquid therein, and is capable of sealing the fire starter 10. The material of the packaging 160 may maintain its integrity and not break down at elevated temperatures of a fire, have relatively low thermal conductivity at elevated temperatures of a fire, be non-combustible, be environmentally friendly, have thermal efficiencies that do not deteriorate over time, and have low thermal shrinkage.

The packaging 160 may have one or more removable panels or portions such as, but not limited to top and bottom panels 170, front and rear panels 180, and left and right side panels 190. The packaging 160 may include one or more separation starters 200 (e.g., pull tabs, pull strips, or slits). One or more of the panels 170, 180, 190 may be joined along perforated or weakened lines 210. The one or more separation starters 200 may be used to facilitate selective removal of the one or more of the panels 170, 180, 190 of the packaging surrounding the fire starter 10 to selectively expose one or more surface area portions less than the entire surface area of the fire starter 10. The fire starter 10 burns longer (i.e., the inflammable liquid burns slower), with a smaller flame, when less than the entire surface area of the fire starter 10 is exposed. For example, when only the top panel 170 of the packaging 160 is removed, the fire starter 10 may burn for 45–60 minutes compared to 15–20 minutes when no packaging surrounds the fire starter 10. Removing only the top panel 170 of the packaging 160 may be desirable for using the fire starter 10 as a candle, as a mosquito repellant, or for other longer duration flame applications. More panels 170, 180, 190 may be removed when larger flames are required and a longer duration for the flames is not as important. When re-using the fire starter 10, the fire starter 10 may be wrapped with tin foil or a similar material to selectively expose the surface area of the fire starter 10 to control the size and duration of the flame emitted therefrom in a manner similar to that described above.

Because the fire starter 10 maintains its integrity and does not break down at elevated temperatures, has low thermal conductivity at elevated temperatures, is non-combustible, is highly absorbent, is environmentally friendly, drying restores original properties, thermal efficiencies do not deteriorate over time, has low thermal shrinkage, and has no binders that can break down at high temperatures or over time ensuring optimal thermal performance throughout the lifespan of fire starter 10, the fire starter 10 and method of use is ideal for starting almost any type of fire, and is especially ideal for starting charcoal fires, fireplace fires, and campfires.

It will be readily apparent to those skilled in the art that still further changes and modifications in the actual concepts described herein can readily be made without departing from the spirit and scope of the invention as defined by the following claims.

What is claimed is:

1. A method of using a fire starter having a surface area with multiple surface area portions, the method comprising:
   providing a fire starter made of a low-density xonotlite calcium silicate hydrate with an inflammable liquid and a packaging at least partially surrounding the fire starter, the packaging including one or more selectively removable portions and one or more separation starters to facilitate selective removal of the one or more selectively removable portions;
   removing a portion of the packaging to expose more than one surface area portion of the surface area of the fire starter, but less than the entire surface area of the fire starter;
   lighting the fire starter so that the inflammable liquid in the fire starter burns without significant combustion of the fire starter and a flame burns from the exposed portions of the surface area of the fire starter.

2. The method of claim 1, wherein the fire starter is used to ignite one or more ignitable elements from the group consisting of briquette, charcoal briquette, composite fire log, and wood.

3. The method of claim 1, wherein the inflammable liquid is at least one of lighting fluid, camp fuel, citronella, and kerosene.

4. The method of claim 1, wherein the fire starter has a generally rectangular block configuration.

5. The method of claim 1, wherein removing includes removing more of the packaging to burn a larger, shorter duration flame and removing less of the packaging to burn a smaller, longer duration flame.

6. The method of claim 1, wherein the packaging includes one or more weakened lines to facilitate removal of the one or more selectively removable portions.

7. The method of claim 1, wherein the inflammable liquid is added to the fire starter prior to packaging.

8. A method of using a fire starter having a surface area with multiple surface area portions, the method comprising:
   providing a fire starter made of a calcium silicate hydrate with an inflammable liquid and a packaging at least partially surrounding the fire starter, the packaging including one or more selectively removable portions and one or more weakened lines to facilitate selective removal of the one or more selectively removable portions;
   removing a portion of the packaging to expose more than one surface area portion of the surface area of the fire starter, but less than the entire surface area of the fire starter;
   lighting the fire starter so that the inflammable liquid in the fire starter burns without significantly affecting the integrity of the fire starter and a flame burns from the exposed portions of the surface area of the fire starter.

9. The method of claim 8, wherein removing includes removing more of the: packaging to burn a larger, shorter duration flame and removing less of the packaging to burn a smaller, longer duration flame.

10. The method of claim 8, wherein the packaging includes ore or more separation starters to facilitate selective removal of the one or more selectively removable portions.

11. The method of claim 8, wherein the inflammable liquid is added to the fire starter prior to packaging.

12. A method of using a fire starter having a surface area with multiple surface area portions, the method comprising:
   providing a fire starter with an inflammable liquid and a packaging at least partially surrounding the fire starter, the packaging including one or more selectively removable portions and one or more weakened lines to facilitate selective removal of the one or more selectively removable portions, the fire starter made of a material that maintains its integrity and does not break down at elevated temperatures of a fire, has low thermal conductivity at elevated temperatures of a fire, is non-combustible at elevated temperatures of a fire, and is highly absorbent;

removing a portion of the packaging to expose more than one surface area portion of the surface area of the fire starter more than one surface area portion, but less than the entire surface are a of the fire starter;

lighting the fire starter so that the inflammable liquid in the fire starter burns without significantly affecting the integrity of the fire starter and a flame burns from the exposed portions of the surface area of the fire starter.

13. The method of claim 12, wherein removing includes removing more of the packaging to burn a larger, shorter duration flame and removing less of the packaging to burn a smaller, longer duration flame.

14. The method of claim 12, wherein the inflammable liquid is added to the fire starter prior to packaging.

* * * * *